(12) United States Patent
Oetiker

(10) Patent No.: US 6,463,827 B1
(45) Date of Patent: Oct. 15, 2002

(54) BALANCING ARRANGEMENT FOR ROTATING MEMBER AND METHOD OF MAKING SAME

(75) Inventor: Hans Oetiker, Horgen (CH)

(73) Assignee: Hans Oetikur AG Maschinen- und Apparatefabrik, Horgen (CH)

(*) Notice: Subject to any disclaimer, the term of this patent is extended or adjusted under 35 U.S.C. 154(b) by 0 days.

(21) Appl. No.: 07/446,812

(22) Filed: Dec. 6, 1989

(51) Int. Cl.[7] .............................. F16F 15/28; F16L 33/22
(52) U.S. Cl. ........................ 74/573 R; 74/574; 24/20 R; 24/20 CW; 24/20 EE; 464/180
(58) Field of Search .................... 74/573 R, 574; 464/180; 24/20 R, 20 CW, 20 EE, 20 TT, 20 W, 21, 23 R, 23 EE (56) References Cited

U.S. PATENT DOCUMENTS

| 192,978 A | * | 7/1877 | De Gray ................... 24/23 EE |
| 1,705,895 A | * | 3/1929 | Blair ........................ 24/20 CW |
| 2,941,631 A | * | 6/1960 | Fosberry et al. ............... 24/574 |
| 3,901,046 A | * | 8/1975 | Hofmann ..................... 464/180 |
| 4,106,799 A | * | 8/1978 | Oetiker ........................ 24/20 R |
| 4,299,012 A | * | 11/1981 | Oetiker ....................... 24/20 W |
| 4,492,004 A | * | 1/1985 | Oetiker ....................... 24/20 W |
| 4,882,814 A | * | 11/1989 | Takahashi ............... 24/20 CW |
| 4,910,832 A | * | 3/1990 | Schaub et al. ............ 24/20 TT |

FOREIGN PATENT DOCUMENTS

| GB | 0943486 | * | 1/1964 | ..................... 24/23 |

* cited by examiner

Primary Examiner—Carl D. Friedman
Assistant Examiner—Winnie S. Yip
(74) Attorney, Agent, or Firm—Birch, Stewart, Kolasch & Birch, LLP

(57) ABSTRACT

A balancing arrangement for a rotating member, especially for a hollow shaft made from light-weight metal, in which a counterweight of predetermined size and weight is affixed onto the external surfaces of the rotating member in predetermined position by the use of a clamping band made from a material normally devoid of any significant elastic stretchability. Elastic stretchability is imparted to the clamping band by specially configured sections which may be formed by openings or non-rectilinear lateral band portions which become less non-rectilinear in the presence of tensional forces in the band and which elastically return to a more non-linear shape when the tensional forces disappear. The internal surfaces of the counterweight and/or of the clamping band are provided with anchoring means to assure position retention thereof on the external surfaces of the rotating member.

62 Claims, 3 Drawing Sheets

BALANCING ARRANGEMENT FOR ROTATING MEMBER AND METHOD OF MAKING SAME

FIELD OF INVENTION

The present invention relates to a balancing arrangement more particularly to a balancing arrangement of a hollow rotating member, such as a drive shaft for a motor vehicle.

BACKGROUND OF THE INVENTION

Balancing arrangements by the use of counterweights are known as such in the prior art. Various arrangements have been proposed which rely on fastening counterweights in the position or positions as determined on balancing machines rotating the part to be balanced. These machines are known as such, for example, in connection with balancing the wheels of automobiles where counterweights are attached in predetermined positions on the rim of the wheel.

With the advent of drive shafts for motor vehicles made from light-weight metal such as aluminum or aluminum alloy which have to be balanced, the pre-existing method of balancing such drive shafts consisted of welding counterweights of predetermined size and weight in predetermined positions. This type of drive shaft, contrary to prior art drive shafts, is of hollow aluminum construction and larger diametric dimension than the prior art solid drive shafts. Because the aluminum drive shafts have a wall thickness of about 2.2 mm., the counterweights must be welded to the outer surface of the corresponding cylindrical end piece of the universal joint which is made of a wall thickness of about 5 mm. However, the welding operation not only requires a longer cylindrical end piece of the universal joint to accommodate the largest counterweights and their welded connections, as will be explained more fully hereinafter, but additionally is both time-consuming and costly and always entails also problems inherent with welded connections.

SUMMARY OF THE INVENTION

It is therefore a principal object of the present invention to provide a balancing arrangement which avoids the aforementioned shortcomings and drawbacks encountered with the prior art balancing arrangements and which is both simple and relatively inexpensive in installation and at the same time assures a permanent positioning of the counterweight without the need for welding operations.

The underlying problems are solved according to the present invention in that a counterweight of predetermined size and weight is affixed to the external surface of the rotating member by the use of a clamping band made from a material such as stainless steel devoid of any significant elastic stretchability in the longitudinal direction to which elastic stretchability in the longitudinal direction is imparted by a special configuration of the clamping band involving openings located preferably opposite the area where the open clamping band is interconnected over the counterweight. This entails additional advantages as will also be explained more fully hereinafter. If the open ends of the clamping band are interconnected by a separate connecting member provided with a so-called "Oetiker" ear, then the connecting member can advantageously be used as part of the counterweight whose significance is enhanced by the oppositely disposed openings in the band. The clamping band in accordance with the present invention permits a simple and relatively rapid installation of the counterweight while at the same time assuring that the counterweight is held in its predetermined position.

According to another feature of the present invention, the counterweight may be provided with anchoring means in its internal surfaces so that under the tightening forces applied by the clamping band, it will anchor itself securely in the external surface of the rotating member. These anchoring means may be obtained by ragged non-deburred edges realized, for example, by the use of a dull stamping tool when cutting out the counterweight. In the alternative, the internal surfaces of the counterweights may be roughened by any known subsequent surface treatment or may offer such rough internal surfaces by the use of an appropriate selection of material composition in its manufacture.

The clamping band may also be provided with anchoring means to preclude lateral movement along the external surfaces of the rotating member. The anchoring means in the clamping band can most appropriately be obtained again by ragged non-deburred edges produced by the use of relatively dull stamping tools, particularly when stamping out the sections with openings that impart elastic stretchability to the clamping band.

According to still another feature of the present invention, each counterweight may be provided with outwardly protruding, cold-deformed hook-like members which are spaced from each other by a distance approximately corresponding to the width of the clamping band and defining therebetween a channel receiving the clamping band so that any relative lateral movements between the clamping band and the counterweight are essentially prevented.

According to a still further feature of the present invention, the counterweights are not flat but may be curved with a radius of curvature at least slightly smaller than the radius of curvature of the external surfaces of the rotating member and are made from a material thickness that will adapt itself elastically to the external surfaces of the rotating member under the forces applied to the counterweight by the clamping band.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
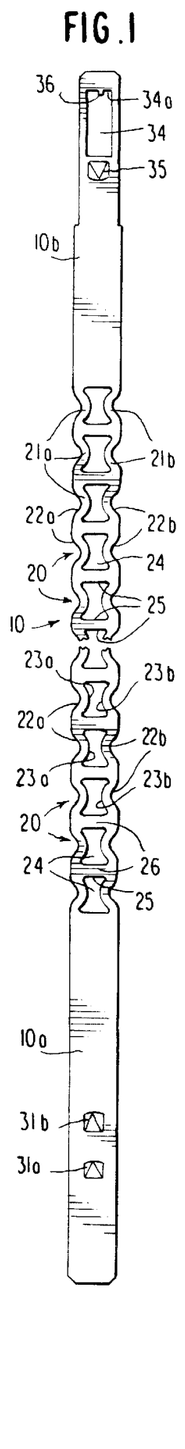
FIG. 1 is a plan view on a clamp structure for use in the balancing arrangement according to the present invention.
Figure 2:
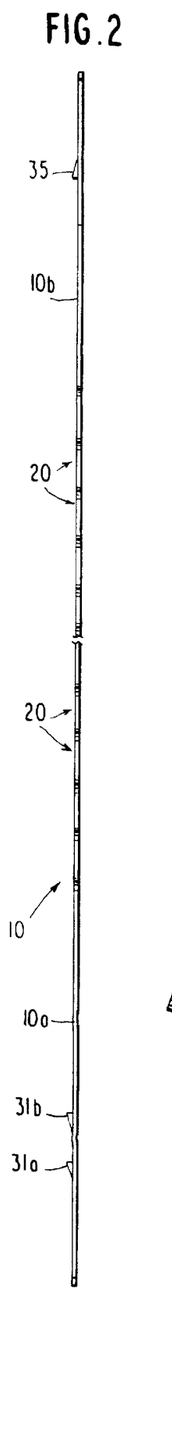
FIG. 2 is a side elevational view of the clamp structure of FIG. 1.

Referring now to the drawing wherein like reference numerals are used throughout the various views to designate like parts, and more particularly to FIGS. 1 and 2, these two figures illustrate a clamping band generally designated by reference numeral 10 made from stainless or galvanized steel and provided with a number of sections generally designated by reference numeral 20 which impart elastic stretchability to the clamping band, made from a material normally devoid of any significant elastic stretchability in its longitudinal direction. Each section 20 thereby consists of two non-rectilinear lateral band portions 21a and 21b that are formed exclusively by cut-outs from the clamping band 10. More specifically, the concavely curved side surfaces 22a and 22b are produced by corresponding concave, segmentally shaped cut-outs along the sides of the clamping band. The inner surfaces 23a and 23b of each lateral band portion 21a and 21b are thereby formed by corresponding surfaces of a cut-out 24 in the central area of the clamping band which in the illustrated embodiment has the shape resembling at least approximately an hourglass. The non-rectilinear lateral band portions 21a and 21b are thereby of substantially constant width over at least a major part of their length which is attained by substantially parallel surfaces 22a, 23a and 22b, 23b. Adjacent sections are connected with each other by web portions 26 extending over the normal width of the clamping band which are defined by transversely extending end surfaces 25 of the central cut-outs 24 of adjacent sections 20. To avoid peak stresses, the corners between the end surfaces 25 and the side surfaces 23a and 23b are thereby rounded off. Similarly, the transitions from the side surfaces 22a and 22b to the normal width of the side surfaces of the band are also rounded off.

To obtain a predetermined elastic strechability in a given clamp the sections may extend over substantially the entire length of the band.

The end portions 10a and 10b devoid of any elastic stretchability-imparting sections 20 include the means for stretching and mechanically connecting the open ends of the clamp structure in the stretched condition. More specifically, the clamping band end portion 10a of the clamping band 10 is provided with two outwardly extending cold-deformed hooks 31a and 31b. The opposite clamping band end portion 10b is provided, starting from the free end thereof with a rectangular opening 34 and another cold-deformed outwardly extending hook 35. The hook members 31a and 35 thereby serve with their tool-engaging abutment surfaces as the means for elastically drawing together the ends of the clamp so that the hook 31b can engage in opening 34 when the clamping band has been elastically stretched by the application of tensional forces with the use of a tool known as such for these purposes. To keep the two end portions 10a and 10b of the clamping band in mutual alignment, a tongue-like projection 36 is provided centrally in the end surface 34a of the opening 34 which engages underneath the cold-deformed hook 31b when the clamp is installed.

Figure 3:
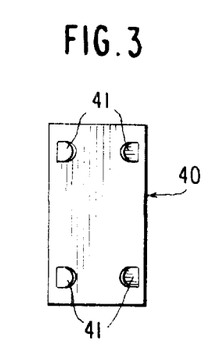
FIG. 3 is a plan view on a counterweight in accordance with the present invention.
Figure 4:
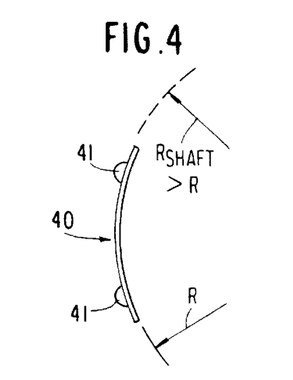
FIG. 4 is a side elevational view of the counterweight of FIG. 3.

The counterweight generally designated by reference numeral 40 is of predetermined weight and configuration, for example, of rectangular configuration and includes four cold-deformed outwardly protruding hook-like projections 41 defining therebetween a channel of a width substantially corresponding to the width of the clamping band 10 to prevent relative lateral movement between the counterweight 40 and the clamping band 10. The counterweight 40 is preferably of curved shape conforming at least approximately to the external surfaces of the rotating member onto which it is to be affixed and preferably is made with a radius of curvature R slightly smaller than the radius of curvature $R_{SHAFT}$ of the external surfaces of the rotating member so that the tightening forces of the clamp structure will cause the counterweight made of appropriate material and/or thickness to elastically adapt itself to the radius of curvature of the rotating member. As a result thereof, the counterweight 40 which may be provided with appropriate anchoring means in its internal surfaces will anchor itself securely in the predetermined position on the outer surfaces of the rotating member. The anchoring means may be in the form of ragged, non-deburred edges produced by the use of a dull tool for punching out the counterweight and/or may be produced by treatment of the internal surfaces by any known means to produce rough surfaces and/or by selection of the material composition for the counterweight.

The clamping band 10 may also be provided with anchoring means to prevent relative movement between the clamping band and the external surfaces of the rotating member. This may be realized appropriately by the use of a dull punching tool for punching out of the clamping band 10 the cut-outs resulting in elastic stretchability-imparting sections 20.

The balancing arrangement according to the present invention entails significant advantages. On the one hand, it is simple to install, relatively inexpensive and reliable under actual operation. On the other hand, it obviates the need for welded connections and the inherent problems attendant thereto, as will be explained in greater detail hereinafter.

The size of the counterweights and the material from which they are made can be chosen at will to meet particular requirements. As with other balancing arrangements, a number of different sizes and weights of counterweights will be necessary to be stocked to permit balancing of the rotating member in the arrangement according to the present invention. Additionally, the clamping band may be made of relatively thin material so that the overlap in the area of the free band ends is relatively insignificant to the problem of balancing the rotating member. Moreover, any imbalance resulting from the overlap can be taken into consideration in the design of the counterweights, as will be explained more fully hereinafter.

Figure 5:
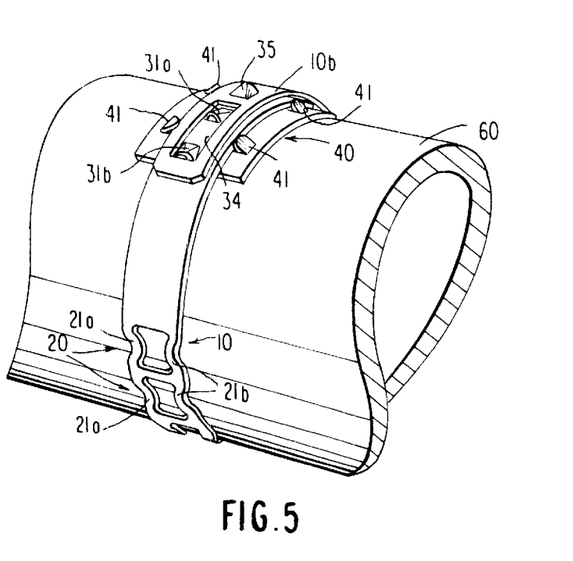
FIG. 5 is a perspective view on a drive shaft with installed balancing arrangement according to the present invention.

FIGS. 5 illustrates a rotating member 60 in the form of a hollow aluminum drive shaft with an installed balancing arrangement according to the present invention.

With the use of a clamping band material made from stainless steel and having an elastic limit of about 2.2 to 2.4 mm., an elastic stretchability of about 0.4 mm. to about 0.5 mm. per section 20 was obtainable. This amount of elastic stretchability was realized even though the tensional forces in the clamping band caused the clamping band to stretch more than 0.4 to 0.5 mm. per section, provided the elastic limit was not exceeded. In other words, an elastic stretchability of about 0.4 to about 0.5 mm. per section is realizable even though the band has been subjected to tensional forces causing a greater stretching thereof, as long as the tensional forces did not cause the clamping band to exceed its yield strength.

Figures 6, 7, 8, 9, 10:
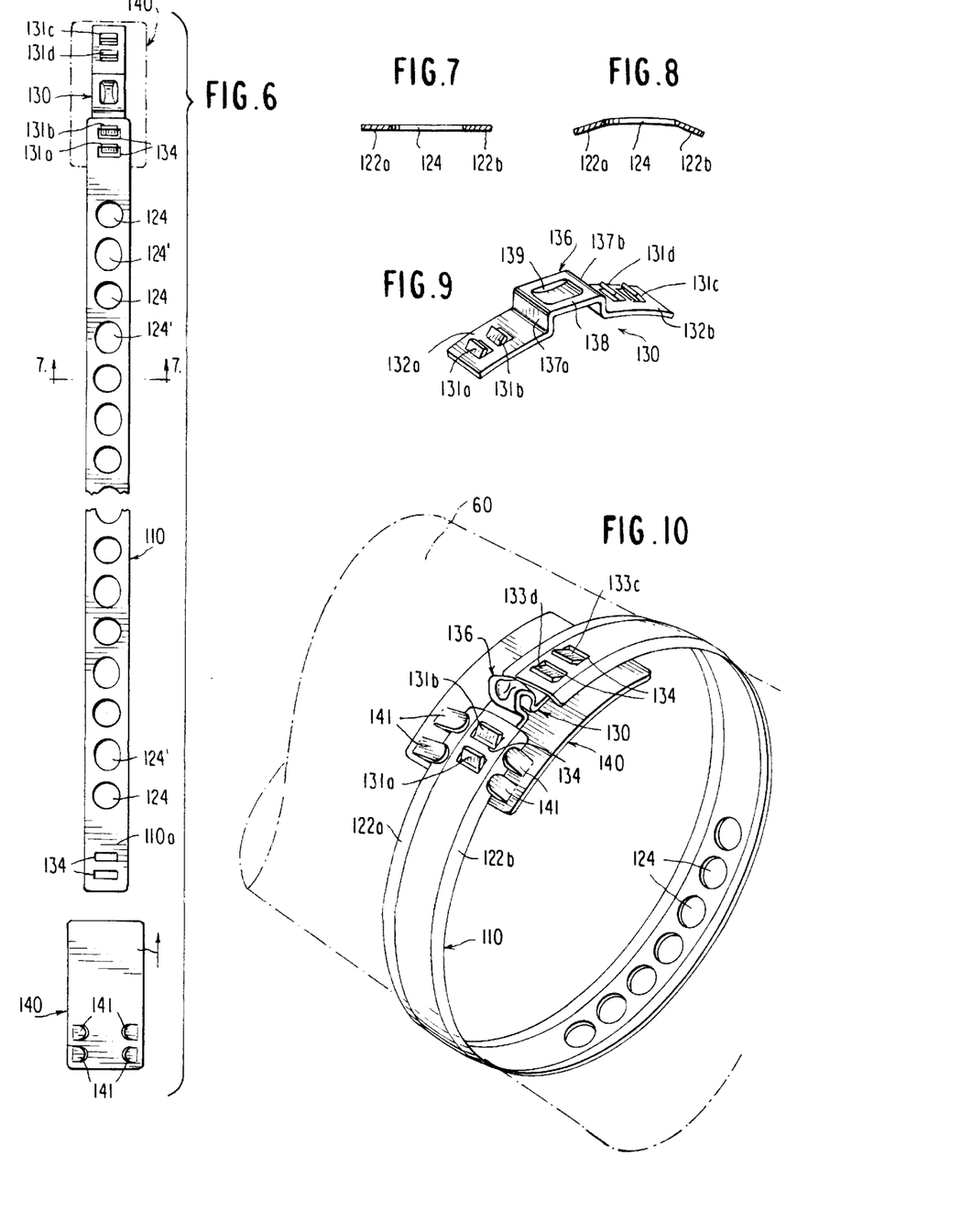
FIG. 6 is a plan view on a modified embodiment of a clamp structure in accordance with the present invention.
FIG. 7 is a cross-sectional view taken along line 7—7 of FIG. 6.
FIG. 8 is a cross-sectional view, similar to FIG. 7, of a modified embodiment of a clamping band in accordance with the present invention having a concavely curved internal surface.
FIG. 9 is a perspective view of the separate connecting member used with the clamp structure of FIG. 6.
FIG. 10 is a perspective view of the clamp structure of FIG. 6 in its installed condition.

FIG. 6 illustrates a modified embodiment of a clamp structure in which a separate connecting member generally designated by reference numeral 130 is used to mechanically interconnect the open end portions 110*a* and 110*b* of the clamping band generally designated by reference numeral 110. In the embodiment illustrated in FIGS. 6, 7 and 9, the separate connecting member 130 includes a plastically deformable so-called "Oetiker" ear generally designated by reference numeral 136 which includes generally outwardly directed leg portions 137*a* and 137*b* interconnected by a bridging portion 138. The bridging portion may be provided with a reinforcing groove or preferably with a relatively shallow reinforcing depression as disclosed in my copending application Ser. No. 06/922,408, filed on Oct. 23, 1986, the subject matter of which is incorporated herein by reference. The corresponding British application has been published as British Patent No. 2,160,577. The separate connecting member 130 includes circumferentially directed extensions 132*a* and 132*b* provided with tab-like outwardly extending hook members 131*a*, 131*b*, 131*c* and 131*d* operable to engage in corresponding rectangular apertures 134 provided in the clamping band end portions 110*a* and 110*b*.

The clamping band 110 is provided with alternating circular and oval openings 124 and 124' which impart to the clamping band 110 a limited elastic stretchability in the longitudinal direction by about 0.2 mm. However, as the separate connecting member 130 is provided with a plastically deformable ear 136, the reduced elastic stretchability imparted by openings 124 and 124' is sufficient because the limited elastic stretchability is assisted by the compensating ability of the plastically deformable ear 136 as known in the art. The hook-like members 131*a*–131*b* are thereby tab-like members obtained by bending-out the band material after substantially U-shaped cuts. This permits a pre-assembly of the clamping band 110 and of the connecting member 130 by inserting the hook-like members 131*a* and 131*b* into the apertures 134 in the end portions 110*b* of the clamping band 110 and thereafter pressing down on the hook-like members 131*a* and 131*b*.

The counterweight 140 is again provided with four protuberances which may be in the form of cold-deformed hooks and which define again a channel to prevent lateral movement of the clamping band 110 relative to the counterweight 140. In the embodiment of FIGS. 6 and 7, the clamping band 110 is flat as shown in FIG. 7, i.e., the lateral portions 122*a* and 122*b* are in the same plane as the opening 124. By contrast, in FIG. 8, the clamping band is curved concavely which further enhances the anchoring of the clamping band in the outer surface of the rotating member and of the counterweight as the clamping band will seek to straighten out under the influence of the tightening forces resulting from the plastic deformation of the ear 136.

FIG. 10 illustrates an embodiment of a balancing arrangement in accordance with the present invention on a hollow drive shaft 60 in which the clamping band 110 is of the type shown in FIG. 8 while the means imparting elastic stretchability consist of uniformly spaced circular openings 124.

Figure 11:
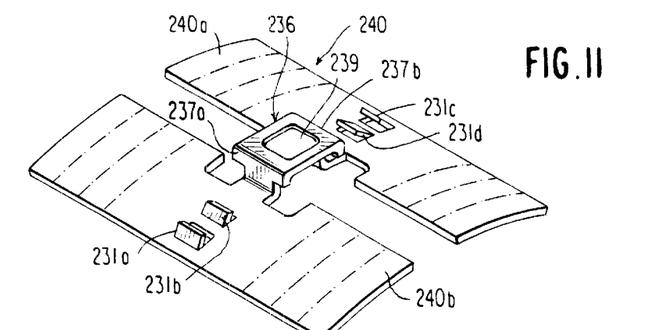
FIG. 11 is a perspective view of a modified embodiment of a separate connecting member in accordance with the present invention which is made integral with a counterweight.

FIG. 11 illustrates a combined connecting member and counterweight generally designated by reference numeral 240 in which the counterweight consists of two rectangular counterweight portions 240*a* and 240*b* curved as described hereinabove in connection with FIGS. 1 through 4 which are integral with the plastically deformable ear generally designated by reference numeral 236 which may again be provided with a reinforcing depression 239 of the type described in my aforementioned copending application. The leg portions 237*a* and 237*b* are thereby connected with the counterweight portions 240*a* and 240*b* by relatively short extensions 232*a* and 232*b* (FIG. 12) which are formed by substantially U-shaped end cuts 242*a* and 242*b*. The tab-like hook members 231*a*, 231*b* and 231*c*, 231*d* are thereby integral with the counterweight portions 240*b* and 240*a*, respectively.

Figure 12:
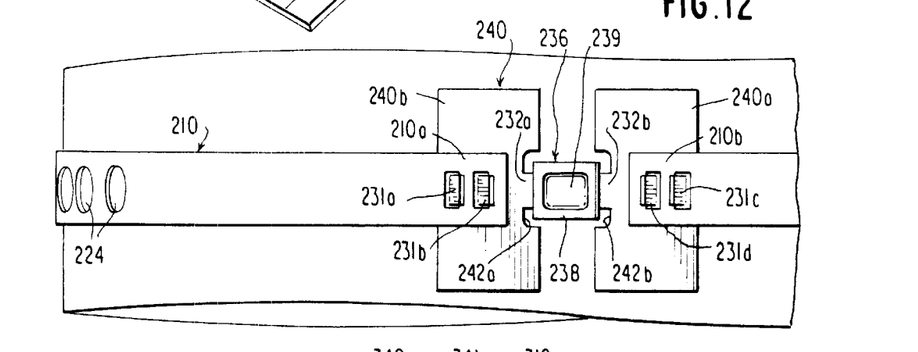
FIG. 12 is a plan view on the installed clamp structure including a connecting member according to FIG. 11.

FIG. 12 illustrates a flat clamping band 210 provided with openings 224 which is interconnected at the open ends 210*a* and 210*b* by a combined counterweight and connecting member of the type shown in FIG. 11.

Figure 13:
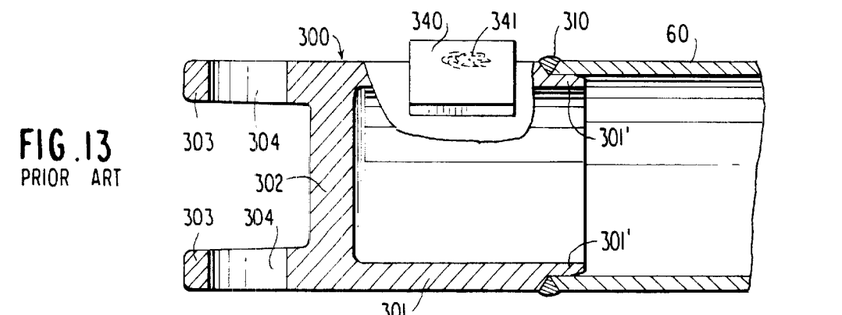
FIG. 13 is an axial cross-sectional view through a prior art connection of a hollow drive shaft with an end piece of a universal joint, illustrating also a welded-on counterweight.

FIG. 13 illustrates a prior art balancing arrangement in which the hollow drive shaft 60 is welded by the welded joint 310 to the cylindrical apron-like extension 301 of the universal-joint end-piece generally designated by reference numeral 300. Two such universal-joint end-pieces are thereby welded to the ends of the drive shaft 60. This universal-joint end-piece 300 includes a fairly thick end wall 302 as well as arm portions 303 provided with joint eyes 304 machined into the arms 303. The counterweight 340 is welded to the cylindrical extension 301 by the welded joint 341. As the wall thickness of the drive shaft 60 is about 2.2 mm., it is necessary to provide a relatively long cylindrical extension 301 of about 65 mm. in length and having a wall thickness of about 5 mm. to permit a welded connection of the counterweight 340 of any required size. The counterweight 340 cannot be welded to the drive shaft 60 directly because with a wall thickness of only 2.2 mm. there is always the danger that the welded connection would produce holes that might even occur with a wall thickness of 5 mm. In practice, this means that the end piece 300 must be provided with a relatively long cylindrical extension 301 which must be machined and adds weight to the drive shaft assembly. In FIG. 13, the cylindrical extension 301 is additionally provided with a reduced shoulder 301' to permit the drive shaft 60 to be mounted over the same though, of course, the drive shaft 60 may also be mounted internally of the end piece 301.

Figure 14:
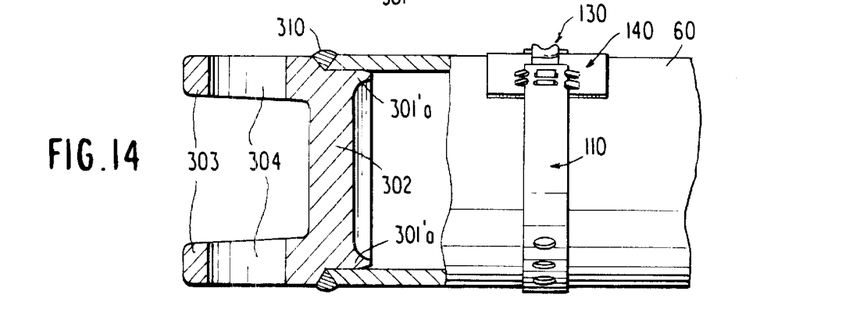
FIG. 14 is an axial cross-sectional view, similar to FIG. 13, and illustrating the connection between a hollow drive shaft and a universal joint end piece with the use of a balancing arrangement in accordance with the present invention.

In the balancing arrangement according to the present invention illustrated in FIG. 14, a number of significant advantages can be achieved. First of all, the extension 301 can be shortened by about 50 mm. which, in turn, entails a considerable saving because the aluminum weight of two such end-pieces 300 and the time for machining the same are considerably reduced. Furthermore, the counterweight can now be mounted at any place along the length of the drive shaft 60 in the balancing arrangement according to the present invention. Additionally, the welded connection 310 of the drive shaft 60 takes place in the arrangement according to the present invention within the area of the solid, relatively thick end wall 302 which further favors the welded connection. The shoulder 301'*a* of reduced diameter which may terminate in a small taper no longer serves as the sole support for the drive shaft 60 since the latter is now supported also within the area of the relatively thick end wall 302 which provides not only a better support for the drive shaft but also a better base for the welded connection.

As a typical, non-limitative example, six sizes of counterweights 340 might be used with the prior art arrangement of FIG. 13, namely, Counterweight 1—84 mm. (width)×50.8 mm. (length)× 2.54 mm. (thickness)–28.5 gr. in weight.

Counterweight 2—70 mm. (width)×50.8 mm. (length)× 2.54 mm. (thickness)–23.5 gr. in weight.

Counterweight 3—54 mm. (width)×50.8 mm. (length)× 2.54 mm. (thickness)–18.0 gr. in weight.

Counterweight 4—40 mm. (width)×50.8 mm. (length)× 2.54 mm. (thickness)–13.0 gr. in weight.

Counterweight 5—26 mm. (width)×42.0 mm. (length)× 2.54 mm. (thickness)–7.5 gr. in weight.

Counterweight 6—round plate with a diameter of 32 mm., 2.54 mm. in thickness and a weight of 5.5 grams.

In the prior art arrangement according to FIG. 13, these aluminum counterweights are welded on the drive shaft by a special machine. This requires at times several repeated operations which in turn means the shaft has to be suspended for cooling off after each first welding operation and then has to be examined anew for any remaining imbalances in the cooled-off condition. This is necessary because the shaft may undergo stresses or distortions as a result of the heat occurring during the welding operation and new imbalances may occur in a respective drive shaft.

As pointed out above, it is also necessary in the prior art arrangement to have at both ends of the drive shaft an end-piece with a cylindrical extension having a length of about 65 mm. and 5 mm. in thickness because the drive shaft itself has a wall thickness of only about 2 mm. This is necessary in order to be able to weld-on the counterweights as with the use of a 2.2 mm. thickness, holes are likely to occur during the welding operation.

With the use of the balancing arrangement according to the present invention, the end-pieces of the universal joints over which the drive shaft is welded can be reduced in length by about 50 mm. This offers considerable savings because the weight of the end-pieces as well as the machining time of the end-pieces can be considerably reduced.

In a non-limiting embodiment of the present invention, a clamping band made from stainless steel with a width of 10 mm. and a thickness of 1 mm. was provided with a number of, for example, seven elastic stretchability-imparting sections 20 of the type illustrated in FIGS. 1 and 2. The open ends of this clamping band were provided each with two apertures of the type shown in connection with apertures 134 in FIG. 6 whereby a separate connecting member of the type shown in FIG. 9 was used to draw together the open ends of the clamping band and apply the required holding forces for the underlying counterweight. Of course, if greater holding forces are required, the width and/or thickness of the clamping band can be increased.

The connecting member provided with the plastically deformable ear of the type illustrated in FIG. 9 had a weight of 4.5 gr. which meant that the balancing weight could be reduced by that amount. Furthermore, the elastic stretchability-imparting sections 20 of the type shown in FIG. 1 reduce the weight in the clamp structure opposite the connecting member and counterweight which permits a further reduction in the counterweight.

In the actual embodiment described so far, the mass of the connecting member can remain the same, the mass of the clamping band can remain the same for all balancing arrangements, and only the balancing weight has to be exchanged. Additionally, the present invention permits the counterweights to have approximately the same dimensions in appearance.

In order to avoid confusion and mixups, the balancing arrangement according to the present invention consists of the elastically stretchable stainless steel band of identical dimensions in length, width and thickness and of the identically dimensioned separate connecting member with a so-called "Oetiker" ear as well as of counterweights which are different. According to the balancing arrangement of the present invention, the counterweights may have the following dimensions whereby the number of the counterweight corresponds to that used in the prior art welded arrangement:

Counterweight 1—54 mm. (width)×25 mm. (length)×2.0 mm. (thickness)=20.4 gr. which corresponds quite accurately to the balancing weight of 28.5 gr. taking into consideration the openings in the clamping band which are disposed opposite the counterweight.

Counterweight 2—52 mm.×25 mm.×1.5 mm.=14.6 gr. which corresponds quite accurately to the balancing weight of 23.5 gr. taking into consideration the openings in the clamping band which are disposed opposite the counterweight.

Counterweight 3—49 mm.×25 mm.×1.0 mm.=9.8 gr. which corresponds quite accurately to the balancing weight of 18.0 gr., taking into consideration the openings which are disposed opposite the counterweight.

Counterweight 4—47 mm.×25 mm.×0.5 mm.=4.5 gr. which corresponds quite accurately to the counterweight of 13.0 gr. taking into consideration the openings which are disposed opposite the counterweight.

Counterweight 5—in this case, the counterweight is no longer necessary because the clamp structure itself produces a counterweight of 4.5 gr. and an effective counterweight of 7.5 gr. can be obtained with a number of openings in the clamping band which are disposed opposite the plastically deformable ear in the connecting member.

Counterweight 6—also in this case the counterweight is no longer necessary because the clamp structure itself provides 4.5 gr. counterweight and a counterweight of 5.5 gr. can be realized quite accurately with the openings in the steel clamping band which are disposed opposite the plastically deformable ear.

The foregoing indicates that the counterweights can be made similar in appearance, with only their weight changed by changes primarily in thickness. The balancing arrangement according to the present invention thus permits the use of the same connecting member with plastically deformable ear and the same band length. By the use of a pneumatic pincer-like tool, the ear can be closed always with the same closing pressures so that the different material thicknesses of the balancing weights can be compensated by the more or less opening of the ear. Also, tolerances in the drive shaft become insignificant as a result thereof.

The spring action which becomes necessary for holding the balancing weight in place by reason of the thermal expansions and contractions of the drive shaft, is attained by the spring action in the stainless steel clamping band and in the plastically deformable ear and to the extent necessary by the curvature in the band itself.

The balancing arrangement according to the present invention can also be used with great advantage on the assembly line. The clamping band, the counterweight and the separate connecting member with the plastically deformable ear are supplied pre-assembled and pre-deformed into round configuration. The assembly person merely needs to install this preassembled structure in proper position over the drive shaft whereupon the ear can be closed with predetermined force by the use of pneumatic pincers. If the ear should project too far even in its closed condition, the pneumatic pincer-like tool at the same time it deforms the ear, could also automatically press down on the bridging member so that the thus-deformed ear would project minimally from the drive shaft.

As the various parts of the invention are metal parts made from a continuous sheet metal hand with the use of conventional techniques, these parts, as known to those skilled in the art, are subject to certain limitations in their dimensional accuracies and configurations. This is not only due to inherent manufacturing limitations but also due to considerations of manufacturing costs which increase with an increase in the specified accuracy of the parts of the dies. Under typical operating conditions these dies operate at relatively high speeds and therefore necessarily undergo wear and tear affecting the shape and dimensions of the manufactured parts. The shape and dimensions of a section are affected by these conditions.

It is understood that the foregoing example is merely illustrative of the present invention which is not to be limited thereto but which is susceptible of numerous modifications as is readily apparent from above.

Thus, while I have shown and described several embodiments in accordance with the present invention, it is understood that the same is not limited thereto but is susceptible of numerous changes and modifications as known to those skilled in the art. For example, the configuration of the elastic stretchability-imparting sections may be varied at will to achieve particular results, it being necessary only that the arrangement be such that the desirable elastic stretchability is achieved and the effective counterweight is realized, as required. Additionally, the present invention is not limited for use with rotating members made from aluminum but can also be used with rotating members made from other metallic materials or alloys thereof as well as those made from plastic material or from other exotic materials such as high-temperature sintered material.

I therefore do not wish to be limited to the details shown and described herein but intend to cover all such changes and modifications as are encompassed by the scope of the appended claims.

I claim:

1. A balancing arrangement for a rotating member having external surfaces, comprising counterweight means of predetermined size and weight selected to compensate for an imbalance in the rotating member, and a clamp structure adapted to tightly engage an external surface of the rotating member and of the counterweight means with the latter in a predetermined position for fixedly securing said counterweight means onto the external surfaces of said rotating member in said predetermined position including clamping band means of finite length and elastically stretchable in its longitudinal direction and connecting means for mechanically connecting the free ends of said clamping band means including means for tightening the clamping band means about said rotating member and said counter weight means, said connecting means being located within a circumferential area of the clamping band means in which any weight of the connecting means is in effect additive to the weight of the selected counterweight means.

2. A balancing arrangement according to claim 1, wherein said clamping band means is made from galvanized or stainless steel material substantially devoid of elastic stretchability in its longitudinal direction, and further means formed in said clamping band means for imparting to said clamping band means predetermined elastic stretchability in its longitudinal direction.

3. A balancing arrangement according to claim 2, wherein said rotating member is hollow and made from a lightweight metal or alloy thereof.

4. A balancing arrangement according to claim 3, wherein said rotating member is an aluminum or aluminum alloy drive shaft.

5. A balancing arrangement according to claim 3, wherein the counterweight means also includes means for anchoring the counterweight mean in the external surfaces of the rotating member.

6. A balancing arrangement according to claim 5, wherein the anchoring means are formed at least in part by ragged non-deburred edges in the counterweight means.

7. A balancing arrangement according to claim 6, wherein the ragged non-deburred edges in the counterweight means are obtained by at least one of cutting and stamping operations with the use of relatively dull tool means.

8. A balancing arrangement according to claim 5, wherein the clamping band means also includes means for anchoring an internal surface of the clamping band means in the external surfaces of the rotating member and of the counterweight means.

9. A balancing arrangement according to claim 8, wherein the anchoring means are formed at least in part by ragged non-deburred edges of the clamping band means.

10. A balancing arrangement according to claim 9, wherein the ragged non-deburred edges in the clamping band means are obtained by at least one cutting and stamping operations with the use of relatively dull tools.

11. A balancing structure according to claim 10, wherein the anchoring means in at least one of clamping band means and counterweight means are formed at least in part by non-smooth internal surfaces thereof.

12. A balancing arrangement according to claim 11, wherein the non-smooth internal surfaces are conditioned at least in part by at least one of material composition, manufacture and after-treatment of the respective part to obtain the desired internal anchoring surfaces.

13. A balancing structure according to claim 2, wherein said clamping band means and said counterweight means are provided with anchoring means for preventing sliding movement thereof on the external surfaces of the rotating member when the clamping band means and the counterweight means are in their installed condition.

14. A balancing arrangement according to claim 2, wherein said counterweight means is provided with means minimizing relative lateral movement transverse to the longitudinal direction of the clamping band means between the latter and the counterweight means.

15. A balancing structure according to claim 14, wherein said means minimizing relative movement are formed by protuberances bent out of the counterweight means and defining a channel for the clamping band means.

16. A balancing arrangement according to claim 15, wherein said protuberances are cold-deformed and spaced from one another to define said channel.

17. A balancing arrangement according to claim 2, wherein said further means are formed in effect by band material removal from the clamping band means.

18. A balancing arrangement with the clamping band means having a center longitudinal plane according to claim 2, wherein said further means include at least one section having non-rectilinear lateral band portions on both sides of the center longitudinal plane of the clamping band means.

19. A balancing arrangement according to claim 18, wherein said lateral non-rectilinear band portions are formed by at least one window means disposed in the center area of the clamping band means.

20. A balancing arrangement according to claim 19, wherein the non-rectilinear band portions of said clamping band means are curved concavely along its sides.

21. A balancing arrangement according to claim 20, wherein the non-rectilinear band portions of said clamping band means are shaped to resemble the shape of the adjacent side of a window means formed in the center area of the clamping band means by material removal.

22. A balancing arrangement according to claim 21, wherein the non-rectilinear lateral band portions are formed between a respective side surface of the clamping band means and the corresponding adjacent side of the window means, and wherein each of the two lateral band portions is of substantially constant width over at least a major part of its length.

23. A balancing arrangement according to claim 22, wherein the further means are substantially symmetrical with respect to its center longitudinal plane of the clamping band means.

24. A balancing arrangement according to claim 23, wherein a respective window means has the shape at least approximately resembling an hourglass.

25. A balancing arrangement according to claim 24, wherein the clamping band means includes several sections containing said further means, and wherein a transversely extending web portion of substantially full band width connects adjacent sections.

26. A balancing arrangement according to claim 25, wherein said clamping band means essentially consists of said sections containing said further means over nearly its entire length.

27. A balancing arrangement according to claim 2, wherein said further means are formed by openings in the clamping band means located at least within the area opposite the connecting means when the clamping band means is installed over the rotating member and the counterweight means.

28. A balancing arrangement according to claim 27, wherein said openings are generally of the same shape.

29. A balancing arrangement according to claim 27, wherein said openings are of different shape which follow one another in a predetermined pattern.

30. A balancing arrangement according to claim 27, wherein said connecting means comprises a separate connecting member including a plastically deformable ear means having generally outwardly extending leg portions interconnected by a bridging portion, and connecting extensions connected with said leg portions and provided with outwardly extending hook means operable to engage in corresponding aperture means provided in the end portions of the clamping band means, said connecting extensions extending in opposite circumferential directions away from the ear means.

31. A balancing arrangement according to claim 30, wherein the hook means in at least one of said extensions are tab-like hook members adapted to be bent down after engaging in the corresponding aperture means to enable a pre-assembly of the connecting member to the clamping band means.

32. A balancing arrangement according to claim 30, wherein said bridging portion is provided with reinforcing means.

33. A balancing arrangement according to claim 30, wherein said counterweight means is formed integral with said extensions.

34. A balancing arrangement according to claim 2, wherein said further means are formed exclusively by cut-out means in the clamping band means, and wherein said cut-out means include at least one cut-out in the center area of the clamping band means as well as cut-outs along the sides of the clamping band means within the area of a respective cut-out in the center area.

35. A balancing arrangement according to claim 2, wherein said connecting means includes at least one outwardly extending cold-deformed hook means located near one free end of the clamping band means and operable to engage in an aperture means provided near the other free end of the clamping band means, and wherein the means for tightening the clamping band means by elastic stretching includes oppositely directed force-engaging surface means near the free ends of the clamping band means.

36. A balancing arrangement according to claim 31, wherein said aperture means is provided with a centrally disposed tongue-like projection in its transverse end surface nearer the corresponding free end of the clamping band means operable to engage in a corresponding cold-deformed hook means.

37. A balancing arrangement according to claim 2, wherein said connecting means is a separate connecting member formed integrally with said counterweight means.

38. A balancing arrangement according to claim 37, wherein said separate connecting member is operable to be mechanically detachably connected with said clamping band means.

39. A balancing arrangement according to claim 38, wherein said connecting member includes a plastically deformable ear means, and wherein said counterweight means is formed of two parts connected to opposite sides of the ear means and each including outwardly extending hook means operable to engage in corresponding aperture means provided in the clamping band means.

40. A balancing arrangement according to claim 1, wherein the entire counterweight means is located within said area.

41. A balancing arrangement according to claim 40, wherein the counterweight means is an interchangeable counterweight selected from a number of counterweights of predetermined size and weight, and wherein the weight of the counterweight is selected to compensate for the imbalance in the rotating member.

42. A balancing arrangement according to claim 1, wherein the counterweight means is an interchangeable counterweight selected from a number of counterweights of predetermined size and weight, and wherein the weight of the selected counterweight is selected to compensate for the imbalance in the rotating member.

43. A balancing arrangement for a rotating member having external surfaces, comprising counterweight means of predetermined size and weight and having concavely shaped internal surfaces with a radius of curvature at most equal to the rotating member, and a clamp structure adapted to be tightened about said rotating member and said counterweight means so as to tightly engage external surfaces of the rotating member and of the counterweight means with the latter in a predetermined position for fixedly securing said counterweight means onto the external surfaces of said rotating member in said predetermined position, said clamp structure including clamping band means of finite length and connecting means for mechanically connecting the free ends of said clamping band means within a circumferential area of the counterweight means, at least one of said clamping band means and said connecting means providing elastic stretchability to the clamp structure to enable compensation for thermal fluctuations including means for tightening the clamping band means about said rotating member and said counterweight means whereby the clamping band means, when tightened, causes the counterweight means to elastically adapt itself to the external surfaces of the rotating member.

44. A balancing arrangement according to claim 43, wherein the connecting and tightening means are concentrated within said circumferential area of said counterweight means, with the counterweight means selected as to weight so as to compensate for the imbalance in the rotating member.

45. A balancing arrangement according to claim 44, wherein the selected counterweight means is located at all times exclusively within a single circumferential area.

46. A balancing arrangement according to claim 43, wherein the selected counterweight means is located at all times exclusively within a single circumferential area.

47. A balancing arrangement for a rotating member having external surfaces, comprising counterweight means of predetermined size and weight, and a clamp structure adapted to tightly engage external surfaces of the rotating member and of the counterweight means with the latter in a predetermined position for fixedly securing said counterweight means on said rotating member in said predetermined position, said clamp structure including clamping band means of finite length and elastically stretchable in its longitudinal direction and connecting means for mechanically connecting the free ends of said clamping band means within a circumferential area of the counterweight means whereby the clamping band means, when tightened, causes the counterweight means to be fixedly secured to the external surfaces of the rotating member notwithstanding thermal changes of the rotating member.

48. A balancing arrangement according to claim 41, wherein said clamping band means is made from galvanized or stainless steel material substantially devoid of any significant elastic stretchability in its longitudinal direction, and further means in said clamping band means for imparting to said clamping band means predetermined elastic stretchability in its longitudinal direction.

49. A balancing arrangement according to claim 48, wherein said further means include non-rectilinear lateral band portions on both sides of its center longitudinal plane of the clamping band means.

50. A balancing structure according to claim 48, wherein the further means include openings substantially symmetrical with respect to its center longitudinal plane of the clamping band means.

51. A balancing arrangement according to claim 50, wherein the connecting means includes a plastically deformable ear means to assist the clamping band means to compensate for temperature fluctuations in the arrangement.

52. A balancing arrangement according to claim 51, wherein said further means include non-rectilinear lateral band portions on both sides of its center longitudinal plane of the clamping band means.

53. A balancing arrangement according to claim 48, wherein the clamping band means includes means for anchoring the clamping band means in the external surfaces of the rotating member and of the counterweight means.

54. A balancing arrangement according to claim 53, wherein the counterweight means also includes means for anchoring the counterweight means in the external surfaces of the rotating member.

55. A balancing arrangement according to claim 54, wherein said counterweight means is provided with means minimizing relative lateral movement transverse to the longitudinal direction of the clamping band means between the latter and the counterweight means.

56. A balancing arrangement according to claim 47, wherein the counterweight means is a counterweight structure selected for its weight to compensate for the imbalance in the rotating member.

57. A balancing arrangement according to claim 56, wherein only a single counterweight structure located within a circumferential area of the connecting means is used.

58. A balancing arrangement according to claim 47, wherein only a single counterweight structure located within a circumferential area of the connecting means is used.

59. A balancing arrangement according to claim 47, wherein the counterweight means and connecting means are separate structural parts.

60. A method for balancing a hollow rotatable member, comprising the steps of determining the extent and location of any imbalance in the rotatable member, selecting a balancing structure which provides in effect a counterweight corresponding to the extent of the imbalance in the rotatable member and which includes an open clamping band, connecting means for mechanically connecting the open ends of the clamping band, further means for imparting elastic stretchability to the clamping band in its longitudinal direction which are located in the clamping band at least within the area thereof opposite the connecting means, and a counterweight, and installing the balancing structure on the rotatable member in predetermined position in such a manner that the connecting means is, weight-wise, in effect, additive to the counterweight and the clamping band securely fastens the counterweight on the rotatable member in the predetermined position.

61. A method according to claim 60, further comprising the step of preassembling the clamping band, the connecting means in the form of a separate connecting member with a plastically deformable ear and the counterweight into a preassembled balancing structure, and thereafter fixing the preassembled balancing structure on the rotatable member by closing the ear.

62. A method according to claim 61, wherein the separate connecting member in conjunction with the further means in effect provides the counterweight.

* * * * *